United States Patent
Garmark et al.

(10) Patent No.: US 9,570,059 B2
(45) Date of Patent: Feb. 14, 2017

(54) CADENCE-BASED SELECTION, PLAYBACK, AND TRANSITION BETWEEN SONG VERSIONS

(71) Applicant: Spotify AB, Stockholm (SE)

(72) Inventors: Sten Garmark, Stockholm (SE); Dariusz Dziuk, Stockholm (SE); Mateo Rando, Stockholm (SE); Angus William Sackfield, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 14/883,340

(22) Filed: Oct. 14, 2015

(65) Prior Publication Data

US 2016/0343363 A1 Nov. 24, 2016

Related U.S. Application Data

(60) Provisional application No. 62/163,882, filed on May 19, 2015.

(51) Int. Cl.
  *G10H 1/40* (2006.01)
(52) U.S. Cl.
  CPC .......... *G10H 1/40* (2013.01); *G10H 2210/375* (2013.01)
(58) Field of Classification Search
  CPC ............... G10H 2210/125; G10H 1/08; G10H 2240/135; G10H 1/40; G10H 2210/095; G10H 2210/115; G10H 7/008; G10K 11/175

See application file for complete search history.

(56) References Cited

U.S. PATENT DOCUMENTS

| | | | |
|---|---|---|---|
| 7,771,320 B2 | 8/2010 | Riley et al. | |
| 8,254,829 B1 * | 8/2012 | Kindred | G06F 17/30032 455/3.06 |
| 2006/0107822 A1 | 5/2006 | Bowen | |
| 2006/0136173 A1* | 6/2006 | Case, Jr. | A63B 24/00 702/182 |
| 2006/0288846 A1 | 12/2006 | Logan | |
| 2007/0074617 A1 | 4/2007 | Vergo | |
| 2007/0074618 A1 | 4/2007 | Vergo | |
| 2007/0074619 A1* | 4/2007 | Vergo | G10H 1/42 84/612 |
| 2007/0079691 A1 | 4/2007 | Turner | |
| 2007/0118043 A1 | 5/2007 | Oliver et al. | |
| 2008/0096726 A1* | 4/2008 | Riley | A63B 24/0006 482/8 |
| 2008/0154403 A1 | 6/2008 | Alexander et al. | |

(Continued)

OTHER PUBLICATIONS

U.S. Appl. No. 14/883,252, filed Oct. 14, 2015 for "Repetitive Motion Activity Enhancement Based Upon Media Content Selection".

(Continued)

*Primary Examiner* — Marlon Fletcher
(74) *Attorney, Agent, or Firm* — Merchant & Gould P.C.

(57) ABSTRACT

A system and methods for acquiring cadence and selecting a song version based on the acquired cadence are disclosed. If the system detects a new cadence, then a new song version that corresponds to the new cadence can be played. The new song version playback can start in a corresponding position as the location of playback in a currently-playing song version. Each related song version shares one or more characteristics, such as melody, but is different in at least one characteristic, such as tempo.

14 Claims, 10 Drawing Sheets

(56) References Cited

U.S. PATENT DOCUMENTS

| | | |
|---|---|---|
| 2008/0176712 A1 | 7/2008 | Frimmer |
| 2008/0236370 A1 | 10/2008 | Sasaki et al. |
| 2008/0306619 A1 | 12/2008 | Cerra et al. |
| 2009/0019995 A1 | 1/2009 | Miyajima |
| 2009/0084249 A1 | 4/2009 | Kemp et al. |
| 2010/0075806 A1 | 3/2010 | Montgomery |
| 2010/0186579 A1* | 7/2010 | Schnitman ............ G10H 1/0025 84/625 |
| 2010/0188405 A1 | 7/2010 | Haughay, Jr. et al. |
| 2010/0205222 A1 | 8/2010 | Gajdos et al. |
| 2010/0279822 A1* | 11/2010 | Ford .................. A63B 71/0622 482/8 |
| 2010/0293455 A1* | 11/2010 | Bloch .................. G10H 1/0025 715/255 |
| 2011/0200116 A1* | 8/2011 | Bloch .................. G10H 1/0025 375/240.25 |
| 2013/0070093 A1 | 3/2013 | Rivera et al. |
| 2013/0158686 A1 | 6/2013 | Zhang et al. |
| 2013/0228063 A1 | 9/2013 | Turner |
| 2013/0312589 A1 | 11/2013 | MacPherson |
| 2014/0338516 A1 | 11/2014 | Andri |
| 2014/0354434 A1 | 12/2014 | Lalonde |
| 2014/0357960 A1* | 12/2014 | Phillips .................. A61B 5/486 600/301 |
| 2015/0081066 A1 | 3/2015 | Yeh et al. |
| 2015/0142147 A1 | 5/2015 | Stanghed et al. |
| 2015/0181314 A1 | 6/2015 | Swanson |
| 2015/0182149 A1 | 7/2015 | Rapoport et al. |
| 2015/0242467 A1 | 8/2015 | Bilinski et al. |

OTHER PUBLICATIONS

U.S. Appl. No. 14/883,245, filed Oct. 14, 2015 for "Heart Rate Control Based Upon Media Content Selection".

U.S. Appl. No. 14/883,232, filed Oct. 14, 2015 for "Cadence Determination and Media Content Selection".

U.S. Appl. No. 14/883,298, filed Oct. 14, 2015 for "Cadence-Based Playlists Management System".

U.S. Appl. No. 14/883,273, filed Oct. 14, 2015 for "Multi-Track Playback of Media Content During Repetitive Motion Activities".

U.S. Appl. No. 14/883,295, filed Oct. 14, 2015 for "Search Media Content Based Upon Tempo".

U.S. Appl. No. 14/883,318, filed Oct. 14, 2015 for "Cadence and Media Content Phase Alignment".

U.S. Appl. No. 14/944,972, filed Nov. 18, 2015 for "System for Managing Transitions Between Media Content Items".

U.S. Appl. No. 14/945,008, filed Nov. 18, 2015 for "Identifying Media Content".

U.S. Appl. No. 14/883,323, filed Oct. 14, 2015 for "Accessibility Management System for Media Content Items".

U.S. Appl. No. 14/883,336, filed Oct. 14, 2015 for "Selection and Playback of Song Versions Using Cadence".

International Search Report and Written Opinion from related International Patent Application No. PCT/EP2016/061046, mailed Aug. 4, 2016.

* cited by examiner

CADENCE-BASED SELECTION, PLAYBACK, AND TRANSITION BETWEEN SONG VERSIONS

CROSS-REFERENCE TO RELATED APPLICATION

This application claims priority to U.S. Ser. No. 62/163,882 filed on May 19, 2015 and entitled CADENCE-BASED SELECTION, PLAYBACK, AND TRANSITION BETWEEN SONG VERSIONS, the disclosure of which is hereby incorporated by reference in its entirety.

BACKGROUND

Running, as well as many other recreational or fitness activities, include repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, etc. Examples of video content include movies, music videos, television episodes, audiobooks, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity.

SUMMARY

In general terms, this disclosure is directed to transitioning between song versions based on an acquired cadence of a repetitive activity. In one aspect, a computer readable data storage device storing instructions is disclosed. The instructions, when executed by at least one processing device, can include causing a media-playback device to: acquire a first cadence, initiate playback of a first song version selected from a plurality of related song versions, where the selection of the first song version is based on the first cadence; acquire a second cadence, and initiate playback of a second song version selected from the plurality of related song versions, where the selection of the second song version is based on the second cadence. The first song version and the second song version share at least one characteristic. Each of the plurality of related song versions is different from each of the other plurality of related song versions in at least one characteristic.

In a second aspect, a method for transitioning from a first song version to a second song version is disclosed. The method includes acquiring a first cadence, selecting a first song version that corresponds to the first cadence, streaming the first song version, acquiring a second cadence, selecting a second song version that corresponds to the second cadence, and streaming the second song version.

In a third aspect, a media server is disclosed. The media server can include a database including at least one computer readable data storage device, including a plurality of song versions, where each of the plurality of song versions has a different tempo than each of the other song versions. Also, the at least one computer readable data storage device can include instructions stored thereon which, when executed by at least one processing device, cause the media server to: receive a first request to begin streaming a first song version, where the first song version has a first tempo, enable streaming of a first song version, receive a second request to begin streaming a second song version, where the second song version has a second tempo, and enable streaming of the second song version, where the first tempo and the second tempo are different by at least about 5 beats per minute.

DETAILED DESCRIPTION

Figure 1:
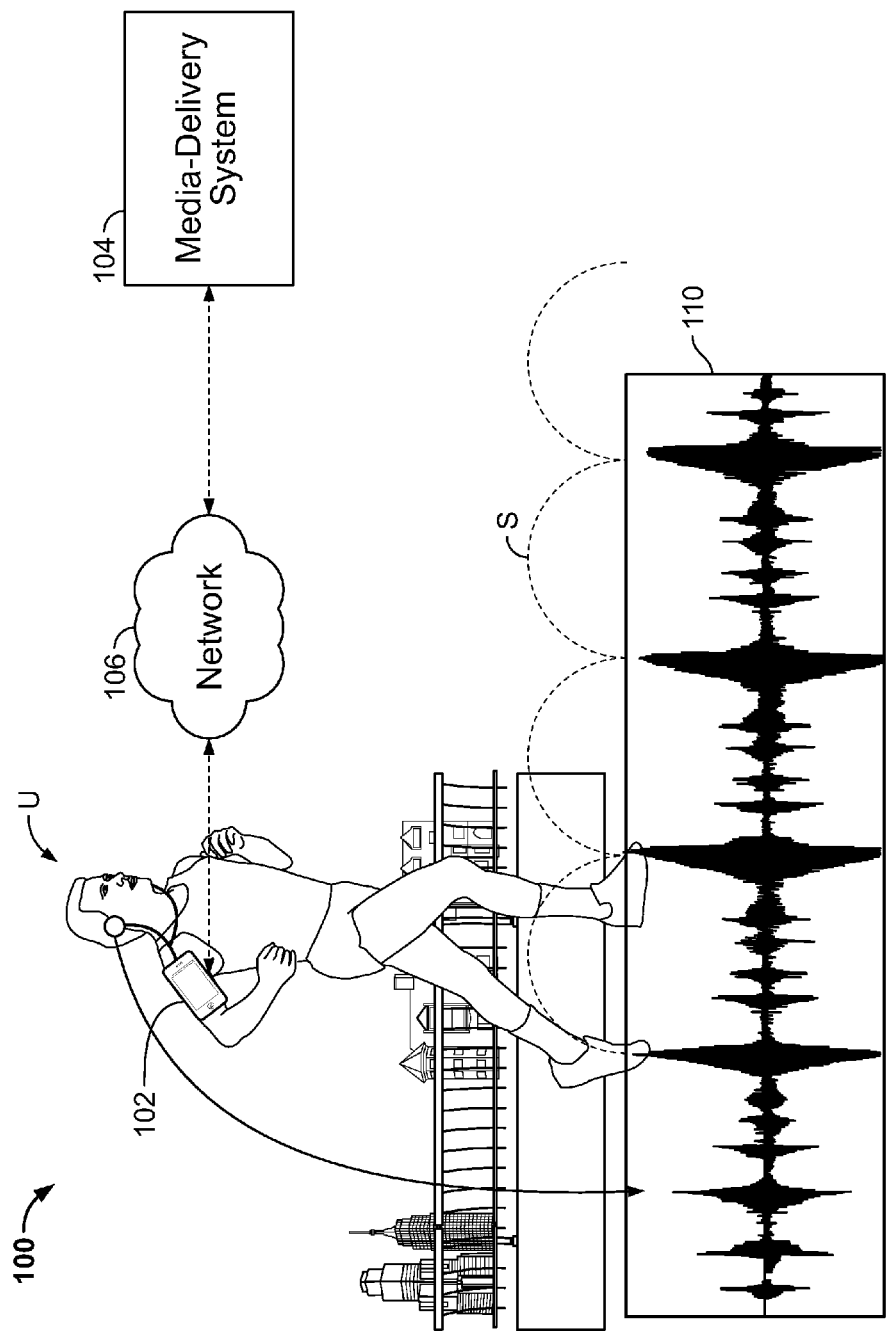
FIG. 1 illustrates an example system for cadence determination and media content selection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

FIG. 1 illustrates an example system 100 for cadence determination and media content selection. The example system 100 includes a media-playback device 102 and a media-delivery system 104. The system 100 communicates across a network 106. Also shown is a user U who is running. The user U's upcoming steps S are shown as well. A step represents a single strike of the runner's foot upon the ground.

The media-playback device 102 operates to play media content items to produce media output 110. In some embodiments, the media content items are provided by the media-delivery system 104 and transmitted to the media-playback device using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-playback device 102 plays media content for the user based on the user's cadence. In the example shown, the media output 110 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a media content item having a tempo equal to or approximately equal to 180 BPM. In other embodiments, the media-playback device 102 plays a media content item having a tempo equal or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media-playback device 102 plays a media content item having a tempo that is equal or approximately equal to an integer multiple (e.g., 2×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

In some embodiments, the media-playback device 102 operates to play music having a tempo that is within a predetermined range of a target tempo. In at least some embodiments, the predetermined range is plus or minus 2.5 BPM. For example, if the user U is running at a cadence of 180 steps per minute, the media-playback device 102 operates to play music having a tempo of 177.5-182.5 BPM. Alternatively, in other embodiments, the predetermined range is itself in a range from 1 BPM to 10 BPM.

Further, in some embodiments, the media-playback device 102 operates to play music having a tempo equal to or approximately equal to a user U's cadence after it is rounded. For example, the cadence may be rounded to the nearest multiple of 2.5, 5, or 10 and then the media-playback device 102 plays music having a tempo equal to or approximately equal to the rounded cadence. In yet other embodiments, the media-playback device 102 uses the cadence to select a predetermined tempo range of music for playback. For example, if the user U's cadence is 181 steps per minute, the media-playback device 102 may operate to play music from a predetermined tempo range of 180-184.9 BPM; while if the user U's cadence is 178 steps per minute, the media-playback device 102 may operate to play music from a predetermined tempo range of 175-179.9 BPM.

Figure 2:
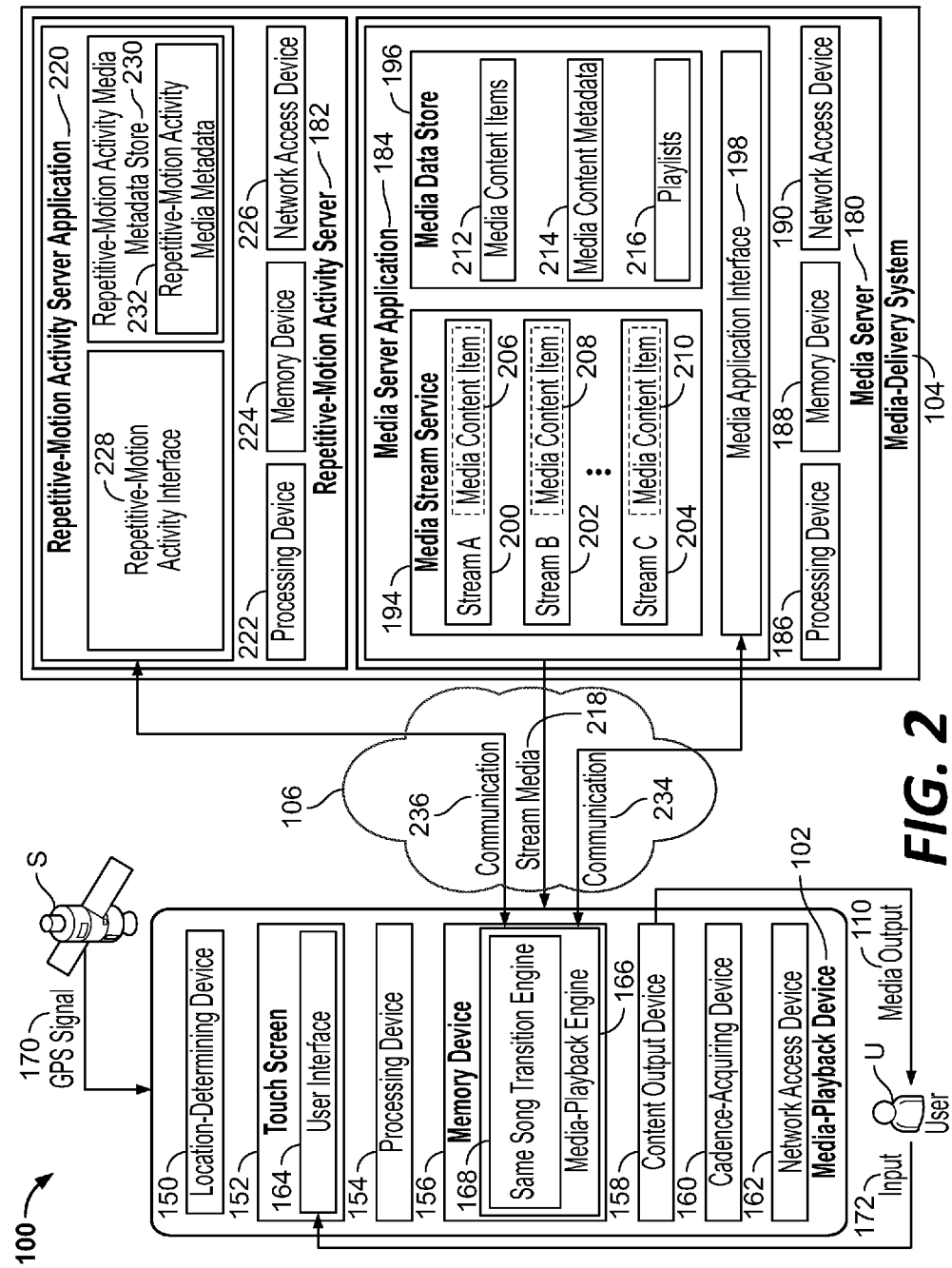
FIG. 2 is a schematic illustration of the example system of FIG. 1.

FIG. 2 is a schematic illustration of an example system 100 for cadence determination and media content selection. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface device. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a same song transition engine 168. In some embodiments, the media-playback engine 166 operates to playback media content and the same song transition engine 168 operates to select media content for playback based on a cadence.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 232 from the media-playback engine 166.

In some embodiments, the media data store 196 stores media content items 210, media content metadata 212, and playlists 214. The media data store 196 may comprise one or more databases and file systems. Other embodiments are possible as well. As noted above, the media content items 210 may be audio, video, or any other type of media content, which may be stored in any format for storing media content.

The media content metadata 212 operates to provide various information associated with the media content items 210. In some embodiments, the media content metadata includes one or more of title, artist name, album name, length, genre, mood, era, etc. The playlists 214 operate to identify one or more of the media content items 210 and. In some embodiments, the playlists 214 identify a group of the media content items 210 in a particular order. In other embodiments, the playlists 214 merely identify a group of the media content items 210 without specifying a particular order. Some, but not necessarily all, of the media content items 210 included in a playlist 214 are associated with a common characteristic such as a common genre, mood, or era.

The repetitive-motion activity server 182 operates to provide repetitive-motion activity-specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228 and a repetitive-motion activity media metadata store 230.

In some embodiments, the repetitive-motion activity server application 220 may provide a list of media content items at a particular tempo to a media-playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 228 operates to receive requests or other communication from media-playback devices or other systems, to retrieve information about media content items from the repetitive-motion activity server 182. For example, in FIG. 2, the repetitive-motion activity interface 228 receives communication 234 from the media-playback engine 166.

In some embodiments, the repetitive-motion activity media metadata store 230 stores repetitive-motion activity media metadata 232. The repetitive-motion activity media metadata store 230 may comprise one or more databases and file systems. Other embodiments are possible as well.

The repetitive-motion activity media metadata 232 operates to provide various information associated with media content items, such as the media content items 210. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that corresponds to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for cadence determination and media content selection, other embodiments are possible as well. For example, in some embodiments, the media-playback device 102 includes a media data store 196 and the media-playback device 102 is configured to perform cadence determination and media content selection without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to play a selected location-based playlist on the media-playback device 102 or to tag a media content item with location data.

Figure 3:
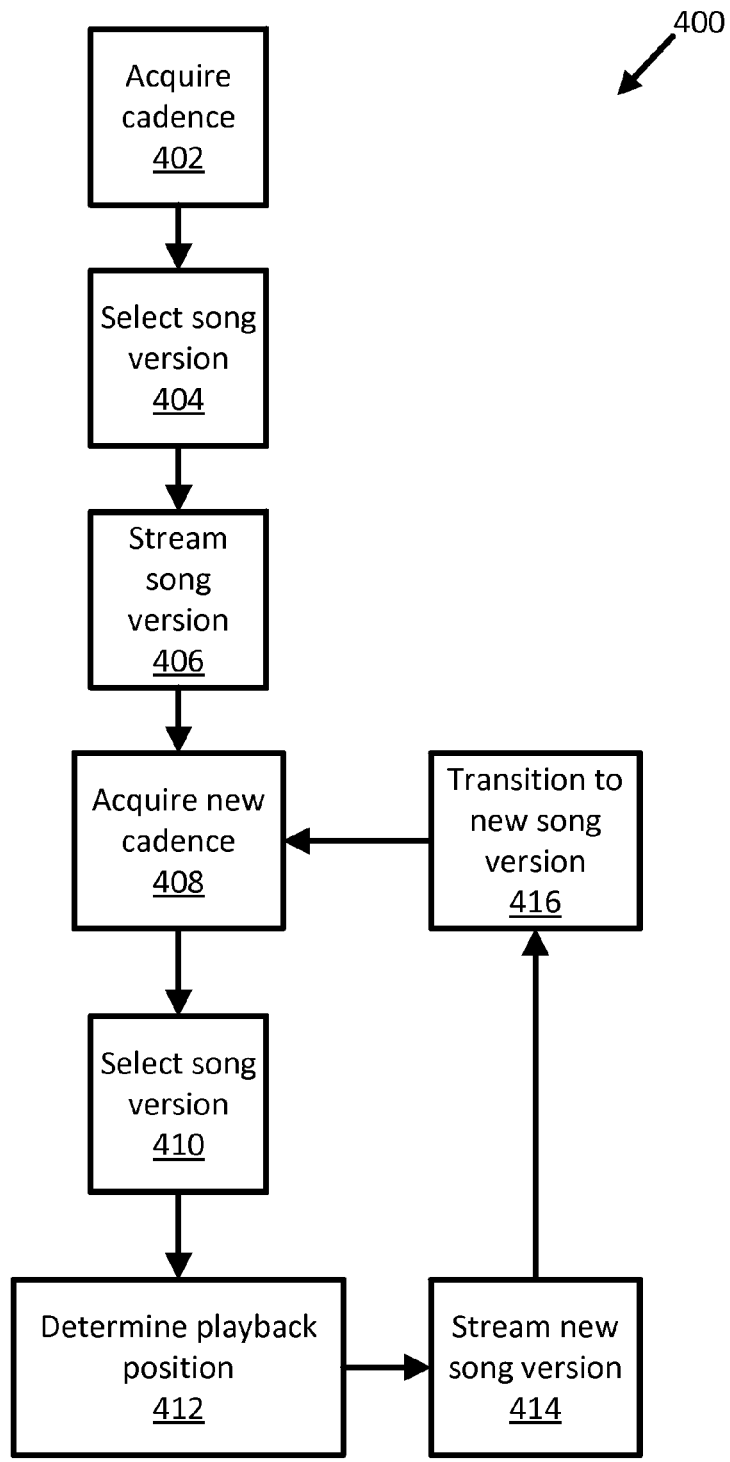
FIG. 3 illustrates an example method for selecting a song version and for playing and transitioning between different versions of a song.

FIG. 3 is a block diagram of an example method 400 for playing and transitioning between different versions of a song. The example method 400 includes acquiring a cadence (operation 402), selecting a song version (operation 404), streaming a song version (operation 406), acquiring a new cadence (operation 408), selecting a song version (operation 410), determining a playback position (operation 412), streaming a new song version (operation 414), and transitioning a new song version (operation 416). The example method 400 can begin with a user selecting a particular song, a song type, a genre, a mood, a tempo, etc., in an operation that is not shown. Other embodiments may include more or fewer operations.

The example method 400 begins by acquiring a cadence (operation 402) associated with a repetitive-motion activity of the user. In embodiments, the cadence is acquired by determining the cadence based on movements of the media-playback device 102 (e.g., using the methods illustrated and described below with reference to at least FIGS. 7-10). In other embodiments, the cadence is acquired from a separate device, from a user input, or otherwise. Regardless of how the cadence is acquired, once that cadence is acquired, the example method 400 proceeds to operation 404.

Figure 4:
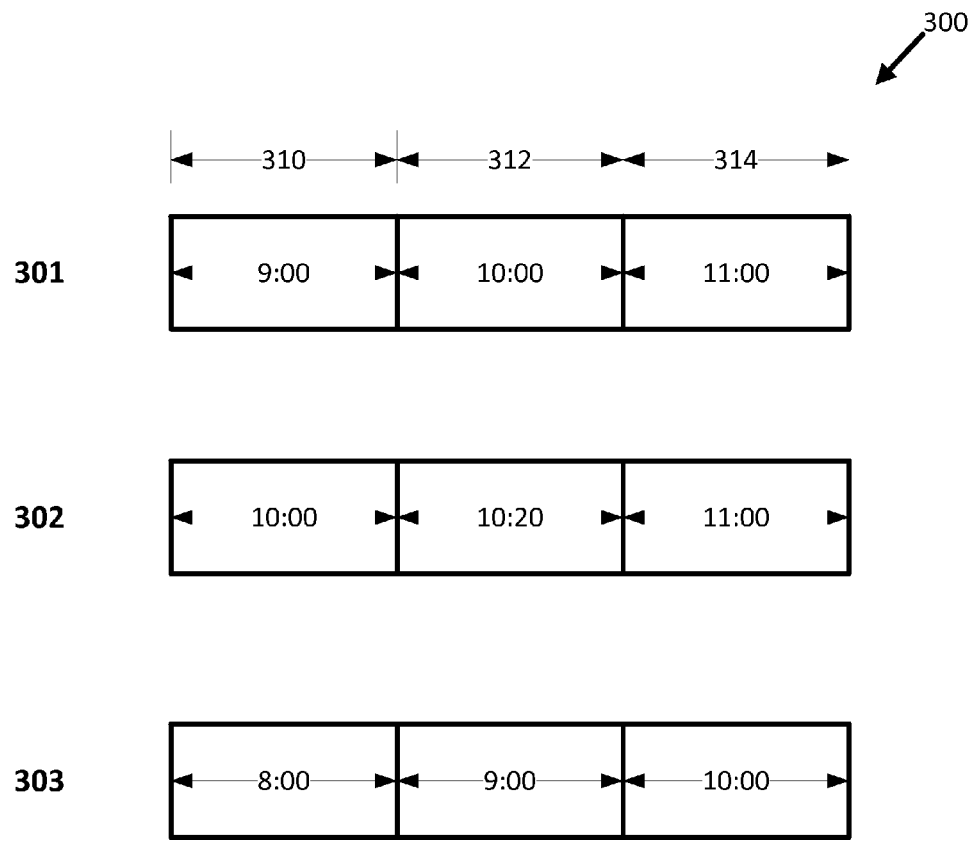
FIG. 4 is a schematic illustration of three versions of a song.
Figure 6:
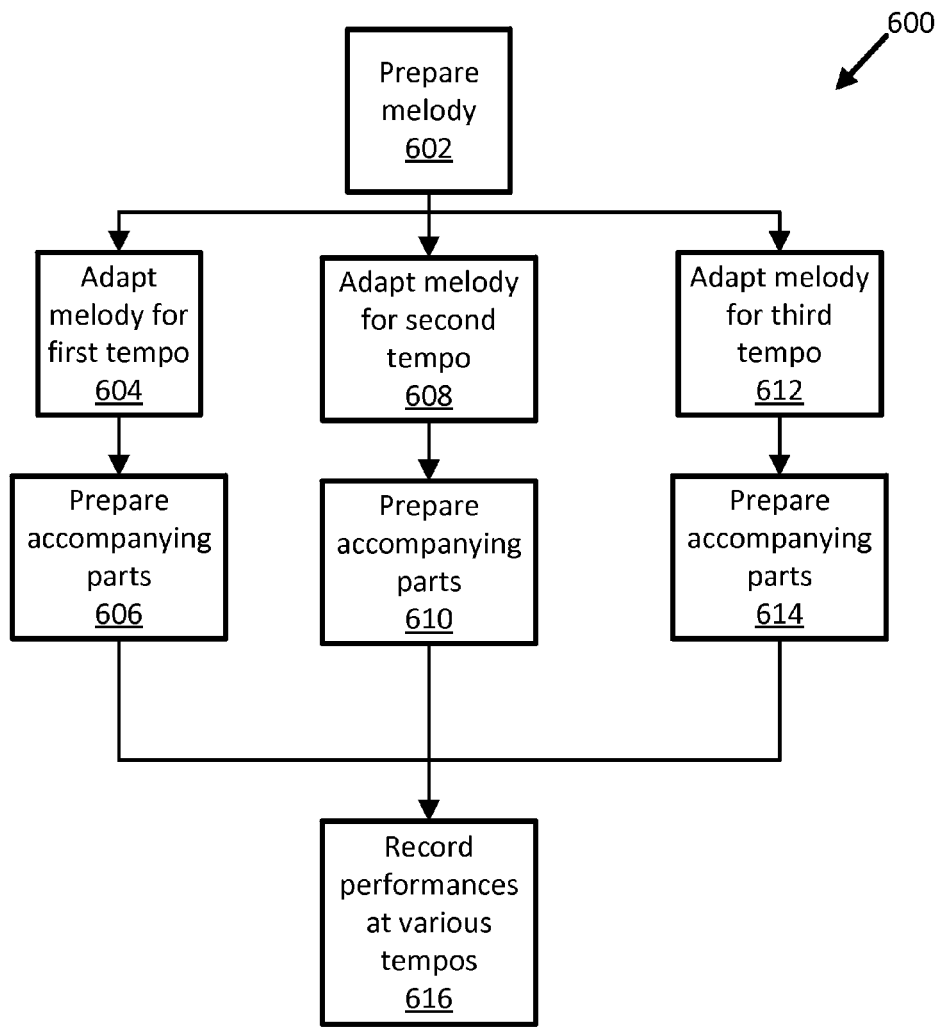
FIG. 6 illustrates an example method for composing a plurality of song versions.

After acquiring the cadence (operation 402), a song version is selected (operation 404). As used herein, "song" means a melody, set of melodies, theme, or set of themes for a musical composition. As used herein, a "song version" is one particular arrangement of the song. In embodiments, each song version of a particular song shares the same melody. FIG. 4 illustrates an example of three song versions. FIG. 6, discussed below, illustrates an example method for composing a plurality of song versions.

FIG. 4 illustrates an example of three song versions 301, 302 and 303. In other embodiments, the song has more or fewer song versions. For one song, each song version is about 3 minutes to about 60 minutes; about 5 minutes; about 10 minutes; about 15 minutes; about 20 minutes; about 25 minutes; about 30 minutes; about 40 minutes; about 45 minutes; about 50 minutes; about 55 minutes; or about 60 minutes in length. Other song durations are possible.

Each song version includes an arrangement of one or more musical parts. Examples of parts include: strings, woodwinds, horns (also termed brass instruments), percussion, drums, vocals, etc. Each part can have one or more sub-parts. For example, horns may include trumpet, trombone, French horn, tuba, etc.

Each song version can be arranged for a particular tempo and be performed at a range of tempos. In the example shown in FIG. 4, the first song version 301 is composed at 140 beats per minute (bpm), the second song version 302 is composed at 160 bpm, and the third song version 303 is composed at 175 bpm. In other embodiments, different tempos are possible.

Each song version can be performed at different tempos that are greater than or lesser than the composed tempo. For example, the first song version 301, composed at 140 bpm in example 300, can be performed at 130 bpm, 135 bpm, 140 bpm, 145 bpm, 150 bpm, 155 bpm, and others. Also, as an example, the second song version 302, composed at 160 bpm in example 300, can be performed at 150 bpm, 155 bpm, 160 bpm, 165 bpm, 170 bpm, and others. Additionally, as an example, the third song version 303, composed at 175 bpm, can be performed at 170 bpm, 175 bpm, 180 bpm, 185 bpm, 190 bpm, and others.

In some embodiments, the arrangements and parts are different between various versions of one song. For example, the percussion arrangement prepared at 140 bpm might be difficult to play or sound rushed at 190 bpm. Thus, as an example, sixteenth notes in the 140 bpm song version may be re-written as eighth notes in the 190 bpm song version. Other modifications for any or all of the parts arrangements are possible.

In some embodiments, the faster song versions may include more bars in the composition. As an example, take a song version written in 4/4 time to be performed at 140 bpm and is 30 minutes long. That song version has 4200 total beats and 1050 bars. When that same song version is performed at 190 bpm, the performance takes just over 22 minutes. In some embodiments, the song version lengths are all within about one to about three minutes of each other. Thus, the song versions written at faster tempos may include one or more codas, additional bars of music not in the slower tempo song versions, and/or other ways to make the song lengths more comparable.

In the illustrated example, each song version 301, 302 and 303 is divided into one or more chapters. For a given song, each song version 301, 302, and 303 has the same number of chapters. The examples in FIG. 4 each have three chapters 310, 312, and 314. However, any number of chapters may be used, for example, 2 chapters, 3 chapters, 4 chapters, 5 chapters, 6 chapters, 7 chapters, 8 chapters, 9 chapters, 10 chapters, etc.

The chapters for a given song version can be stored together in a single file with annotations and/or time stamps that identify the beginning and end of chapters. Alternatively, the chapters for a given song version can be stored in separate files.

In embodiments, the chapters 310, 312, and 314 are further divided into segments. The segments can correspond to changes in the arrangements, such as a dynamics changes like a crescendo, diminuendo, or energy changes, etc.

In the example illustrated in FIG. 4, song version 301 has a first chapter that is 9 minutes long, a second chapter that is 10 minutes long, and a third chapter that is 11 minutes long. Thus, song version 301 is 30 minutes in its entirety. Song version 302 has a first chapter that is 10 minutes long, a second chapter that is 10 minutes, 20 seconds long and a third chapter that is 11 minutes long. Thus, song version 302 is 31 minutes and 20 seconds in its entirety. Song version 303 has a first chapter that is 8 minutes long, a second chapter that is 9 minutes long, and a third chapter that is 10 minutes long. Thus song version 303 is 27 minutes long.

As shown in this example, each song version has a different length but the same number of chapters. Also, the same chapter in different song versions can have the same length, such as the third chapter 314 in song versions 301 and 302, or different lengths, such as the first chapter 310 in song versions 301 and 302.

Returning to operation 404 of FIG. 3, the tempo of the selected song version is the same or nearly the same as the acquired cadence. For example, if a cadence of 179 repetitions per minute is acquired, then a song version with a tempo of about 180 beats per minute is selected in operation 404. Generally, the tempo of the selected song version is within about 5 beats per minute of the acquired cadence.

When the version of the song is identified, a request is made to stream the selected song version (operation 406). In an alternate embodiment, the media playback device can operate in an offline mode, and playback of the song version is initiated from song versions stored locally. As shown in FIG. 2, a media-playback device 102 can stream media 218 over a network 106 from a media server 180, where the media 218 stored on the media server 180 includes a plurality of song versions for a plurality of songs. In embodiments where the user selects the initial tempo of the song, or selects their running cadence, the example method 400 begins with operation 406. The media playback device starts playback of the song version at the beginning of the song, however, a user can modify the starting location of the song version playback.

After streaming the song version (operation 406), the cadence is monitored. In embodiments, the cadence is monitored by continuing to detect the cadence associated with a repetitive movement of the media-playback device 102. In other embodiments, the cadence is monitored by continuing to acquire a cadence from a separate device, a user input, or otherwise.

A new cadence may be acquired in operation 408 that is different from the initially-acquired cadence in operation 402. The cadence can be acquired from measurement components in the media-playback device or an external sensor or sensors that are in communication with the media-playback device. If a new cadence is acquired, then a new song version is selected in operation 410.

Not all changes in cadence will result in the selection of a new song version in operation 410. In embodiments, the cadence is determined to have changed when the acquired cadence is different than the current cadence by more than a predetermined threshold. Additionally, in embodiments, the cadence is determined to change when the acquired cadence is different than the current cadence for at least a predetermined duration, which can be measured in terms of time, number of steps, or other metrics. The predetermined threshold and predetermined duration can be selected to distinguish intentional changes in cadence from short-term, environment-caused changes.

For example, someone running in a city might stop temporarily at a traffic intersection, or cadence might change to traverse a staircase, etc. A minimum period of a new cadence can be required before determining that the user has a new cadence. For instance, about 5 seconds, about 10 seconds, about 25 seconds, about 30 seconds, about 45 seconds, about 60 seconds, about 90 seconds, or about 120 seconds may be required before the example method selects a new song version in operation 410.

Similar to operation 404, in operation 410 a new song version is selected where the tempo of the song version is equal to or substantially equal to the acquired cadence. For example, if the new acquired cadence in operation 408 was 184 repetitions per minute, a song version with about 184 beats per minute would be selected, such as a song version with 184 beats per minute or a song version with 185 beats per minute.

In contrast to operations 404 and 406, after selecting the song version in operation 410, a playback position is next determined in operation 412. The playback position is determined to provide the user with a near-seamless transition from the previous song version to the current song version. Operation 412 is shown and described below with reference to FIG. 5.

Figure 5:
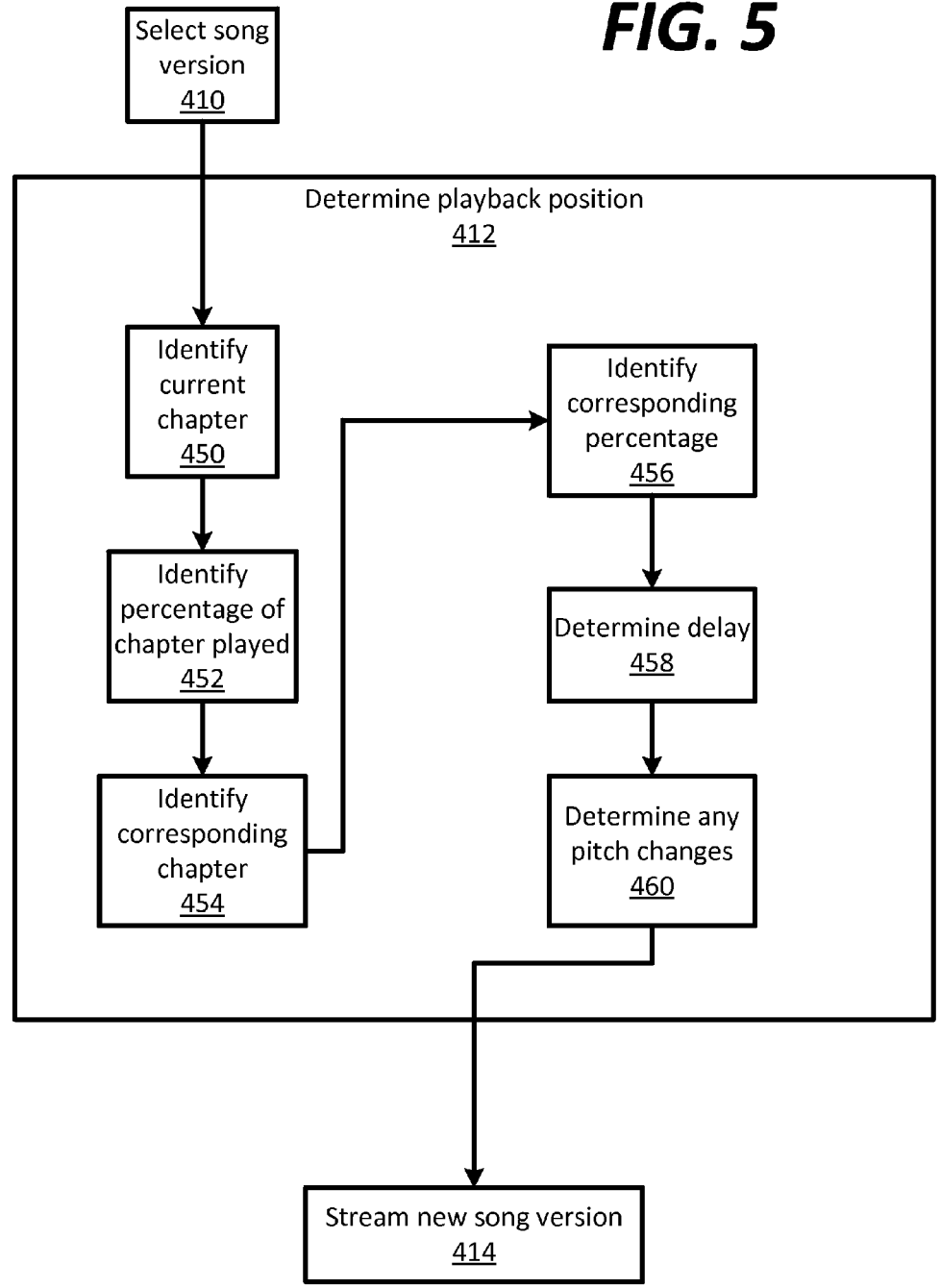
FIG. 5 illustrates an example method for determining a playback position for a next song version.

FIG. 5 illustrates an example determination of a playback position (operation 412). The example determination (operation 412) includes identifying the current chapter (operation 450), identifying the percentage of the chapter played (operation 452), identifying the corresponding chapter (operation 454), identifying the corresponding percentage (operation 456), determining a delay (operation 458), and determining any pitch changes (operation 460). Also shown is the input to the example determination, select song version (operation 410), and the operation following the example determination, stream new song version (operation 414). Other embodiments can include more or fewer operations.

After a song version is selected (operation 410), the chapter of the currently-playing song version is identified (operation 450). Operation 450 can include retrieving metadata, for example, chapters, duration of the song version, duration of the chapters, etc., about the song versions. Additionally, operation 450 can include retrieving metadata that includes the relationship between related song versions.

For example, a playback position of the currently-playing song version is 14:30, or fourteen minutes thirty seconds, and is in chapter 4. As discussed above with reference to FIG. 4, each song version can include one or more chapters and the chapters are consistent across song versions for a particular song.

Next, the percentage of the chapter played is identified (operation 452). Using the example above, the playback position of the currently-playing song version is 14:30 and is in chapter four, which started at 12:00 and ends at 16:30 in the song version. That is, the current chapter is 4:30 in length and 2:30 have played, thus the percentage of the chapter played is about 56%. In embodiments where the song versions are not divided into chapters, the percentage of the song version played is determined after operation 410, rather than the percentage of the chapter (operation 452).

After determining the current chapter and percentage of the chapter played, a corresponding chapter (operation 454) and corresponding percentage of the chapter (operation 456) are determined for the next song version. Using the example discussed with reference to operation 450, the currently-playing song version is in chapter four. Thus, the corresponding chapter for beginning playback of the next song version is chapter four.

Next, about 56% of chapter 4 has been played in the currently-playing song version. Thus, playback of the next song version will begin at about 56% of chapter 4 of the next song version. If the next song version's chapter 4 starts at 11:00 and ends at 15:00, which is four minutes in length, then playback will begin about two minutes and fourteen seconds into the fourth chapter, or at about 13:14 of the entire song version. This starting position might be modified depending on any delay or cross-fading determination in operation 458.

Any delays to accommodate transitioning to the next song version are determined in operation 458. For example, any cross-fading times can be accounted for during operation 458.

Also, the beats of the currently-playing song version and the next song version can be aligned. As an example, an alignment includes any adjustments to make the first beat of each measure in the currently-playing song version align with the first beat of each measure in the next song version. This alignment can include temporarily adjusting the tempo of the currently-playing song version, the tempo of the next song version, or both, such that they match when the next song version is streamed.

After determining the playback location of the next song version, any pitch changes are next determined (operation 460). For example, when transitioning from a currently-playing song version at a tempo of 155 bpm to a next song version at a tempo of 180 bpm, the pitch of the next song version is lowered during the cross-fading. This pitch change can potentially correct any changes in pitch when the tempo of one or both of the song versions is adjusted. After or during cross-fading, the pitch is increased again, for example, over about 0.5 second, about 1 second, about 2 seconds, about 3 seconds, about 4 seconds, or about 5 seconds until it is back at the original pitch. Alternatively, or in combination, the pitch of the currently-playing song version is increased during cross-fading.

Returning to FIG. 3, when the next song version has been selected (operation 410) and a playback position has been determined (operation 412), the next song version is streamed (operation 414). As discussed above with reference to operation 406, the next song version is streamed from a media server or played from a local version.

Then the next song version is transitioned into playback (operation 416). For example, the currently-playing song version is faded out at the same time that the next song version is faded in, which is termed "cross-fading" herein. The cross-fading of the two song versions can occur over about 0.5 second, about 1 second, about 2 seconds, about 3 seconds, about 4 seconds, about 5 seconds, about 7 seconds, about 10 seconds, about 15 seconds, about 20 seconds, or about 30 seconds. Other transition types are possible.

Also, transitioning to the next song version (operation 416) can include a time period of adjusting the pitch of the next song version, adjusting the pitch of the currently-playing song version, or both.

After transitioning to the new song version (operation 416), the example method 400 returns to monitor for a newly-acquired cadence (operation 408).

FIG. 6 illustrates an example method 600 for composing a plurality of song versions. The example method 600 includes preparing a melody (operation 602), adapting the melody for a first tempo (operation 604), preparing accompanying parts (operation 606), adapting the melody for a second tempo (operation 608), preparing accompanying parts (operation 610), adapting the melody for a third tempo (operation 612), preparing accompanying parts (operation 614), and recording performances at various tempos (operation 616). Other embodiments can include more or fewer operations.

The example method 600 begins by preparing a melody (operation 602). The melody can include sub-melodies or sub-parts, such as one or more verses, one or more bridges, one or more refrains, one or more choruses, etc. In embodiments, preparing a melody (operation 602) is preparing the melody for a specific tempo, such as 160 bpm.

After the melody is prepared (operation 602), the melody is adapted for one or more tempos. In the example method 600, the melody is adapted for three tempos: a first tempo (operation 604), a second tempo (operation 608), and a third tempo (operation 612). Each of these is a different song version. In embodiments, the first tempo is 140 bpm, the second tempo is 160 bpm, and the third tempo is 175 bpm. Other tempos are possible.

Part of adapting the melody for a tempo includes preparing accompanying parts (operations 606, 610, and 614). As discussed above, examples of components include: strings, woodwinds, horns (also termed brass instruments), percussion, drums, vocals, etc. Each component can have one or more sub-components. For example, horns may include trumpet, trombone, French horn, tuba, etc.

Considerations for adapting the parts to the different tempos include, for example, pitch, speed, consistency across song versions, and whether something will sound rushed or cluttered.

After one or more song versions are prepared in example method 600, then a plurality of versions are recorded at various tempos (operation 616). In embodiments, performances of the first song version 301 are recorded at 140 bpm, 145 bpm, 150 bpm, and 155 bpm; performances of the second song version 302 are recorded at 160 bpm, 165 bpm and 170 bpm; and performances of the third song version 301 are recorded at 175 bpm, 180 bpm, 185 bpm and 190 bpm. Other performances at various tempos are possible.

The recordings can be a live recording of a musician or group of musicians. The recordings can also be a recording of electronically-generated music, such as a synthesizer, drum machine, etc. These recordings can be stored on a media server or locally on a media playback device. In embodiments, each recording at a particular tempo is stored as one file or as a plurality of files where each file corresponds to a chapter in the recording.

Figure 7:
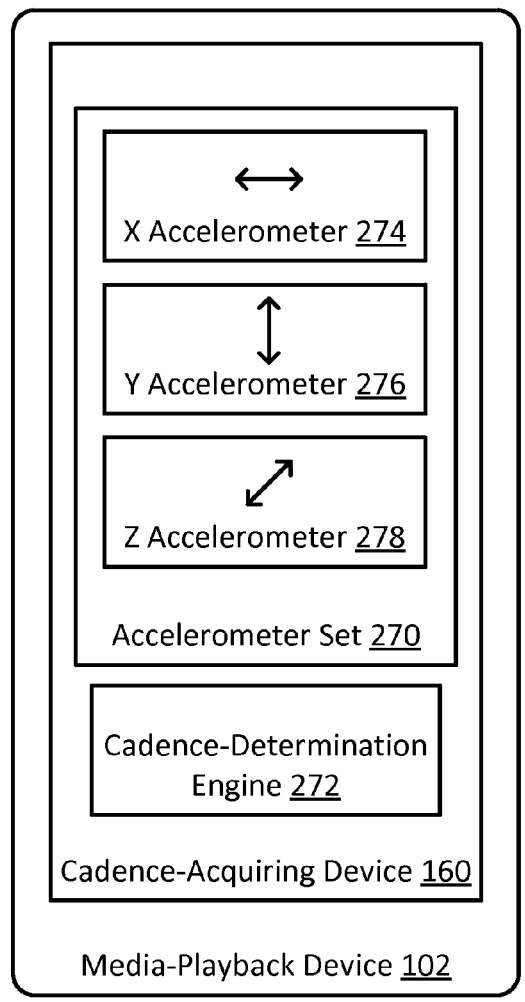
FIG. 7 illustrates an example cadence-acquiring device of FIG. 2.

FIG. 7 illustrates an example cadence-acquiring device 160. In the embodiment illustrated in FIG. 7, the cadence-acquiring device 160 operates to determine a cadence associated with a user based on movement of the media-playback device 102. In this example, the cadence-acquiring device 160 includes accelerometer set 270 and cadence-determination engine 272.

The accelerometer set 270 includes at least one accelerometer. An accelerometer is a device that is used to measure acceleration, including gravitational acceleration. In some embodiments, an accelerometer measures acceleration in a single direction. In other embodiments, an accelerometer measures acceleration in more than one direction, such as in three directions. In some embodiments, the orientation of an accelerometer (and therefore the orientation of the media-playback device 102) is inferred by comparing the measured direction and magnitude of acceleration to an expected direction and magnitude of gravitational acceleration. Additionally, in some embodiments, the motion of the accelerometers is inferred from one or more measured acceleration values.

In the example shown, the accelerometer set 270 includes three accelerometers: an X accelerometer 274, a Y accelerometer 276, and a Z accelerometer 278. In this example, the X accelerometer 274 operates to measure acceleration in a horizontal direction relative to the media-playback device 102. Similarly, in this example, the Y accelerometer 276 operates to measure acceleration in a vertical direction relative to the media-playback device 102. Similarly, in this example, the Z accelerometer 278 operates to measure acceleration in a front-to-back direction relative to the media-playback device 102. In other embodiments, the accelerometer set 270 includes three accelerometers that each operate to measure acceleration in three orthogonal directions (i.e., each of the three directions is pairwise perpendicular to the other two directions). In this manner, the accelerometer set 270 operates to determine acceleration in three-dimensional space.

The cadence-determination engine 272 operates to determine a cadence based at least in part on the measurements from the accelerometer set 270. An example method of determining cadence is illustrated and described with respect to at least FIG. 8.

However, as noted above, some embodiments of the cadence-acquiring device 160 do not include the accelerometer set 270 or the cadence-determination engine 272. In these embodiments, the cadence-acquiring device 160 may operate to receive a cadence value over a network from an external device or to receive a user input representing a cadence value.

Figure 8:
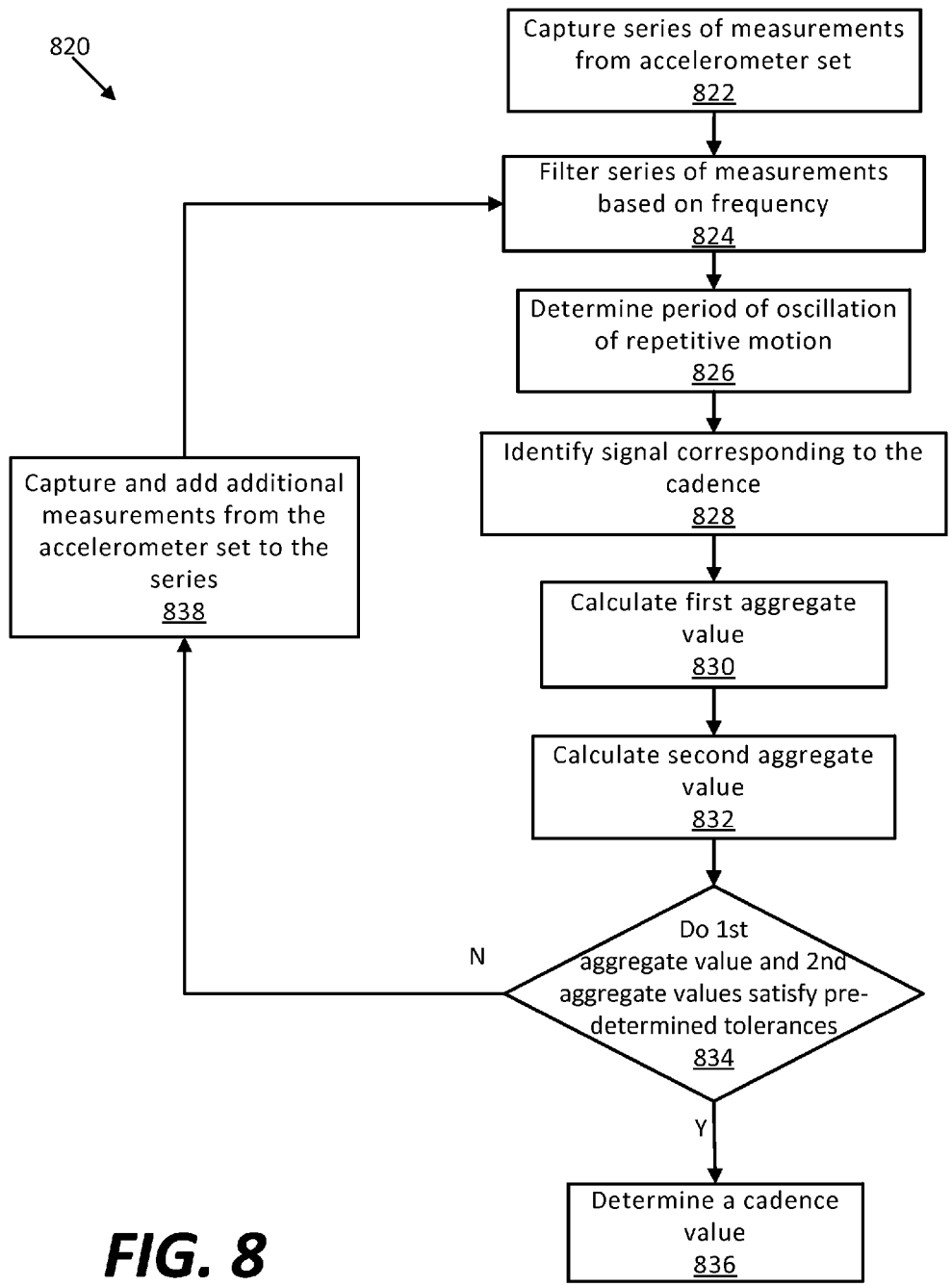
FIG. 8 illustrates an example method of determining cadence performed by some embodiments of the cadence-determination engine of FIG. 2.

FIG. 8 illustrates an example method 820 of determining cadence performed by some embodiments of the cadence-determination engine 272 using the accelerometer set 270.

At operation 822, a series of measurements is captured from one or more accelerometers of the accelerometer set 270. For purposes of this example, the method 820 will be described when measurements are captured from a set of three orthogonally-oriented accelerometers. However, other embodiments capture measurements from different numbers and different configurations of accelerometers.

In at least some embodiments, the measurements are captured at a sample rate of 50 Hz. In other embodiments, the measurements are captured at a different sample rate such as a sample rate in the range of 20-200 Hz. Generally, with higher sample rates there will be less error in calculating the cadence. Other embodiments may use different sample rates, including variable sample rates, as well. In at least some embodiments, the captured samples from each accelerometer are stored as a separate series of data points.

In some embodiments, the captured measurements are amplified. For example, the acceleration measurements may be quite small when a user places the media-playback device 102 on a treadmill rather than holding it. By amplifying the measurements, the media-playback device 102 operates to sense a cadence from smaller vibrations transmitted through the treadmill. In some embodiments, the captured measurements are amplified if none of the signals from any of the accelerometers exceed a pre-defined threshold for a specific period of time. Furthermore, some embodiments operate to amplify the captured measurements if the location-determining device 150 indicates that the user is indoors or stationary.

At operation 824, the series of measurements are filtered based on frequency to generate filtered signals. For example, in some embodiments, each series is filtered with a band-pass filter such as a band-pass filter comprising third-order Butterworth filters. Beneficially, Butterworth filters provide a generally flat frequency response and thus allows for reliable energy estimation of the filtered signal. Furthermore, a third-order Butterworth filter provides a steep enough response to discard/attenuate signals outside of the desired region. Other embodiments, however, use other types of band-pass filters. For example, some embodiments use a fifth-order Butterworth filter. In some embodiments, the band-pass filter is tuned to pass the portion of the signal in the series that is likely to correspond to running (e.g., having a frequency of 140-200 steps per minute). For example, the band-pass filter may discard frequencies below 140 steps per minutes (e.g., walking, holding the media-playback device 102, etc.) and above 200 steps per minute (e.g., vibrations).

Figure 9:
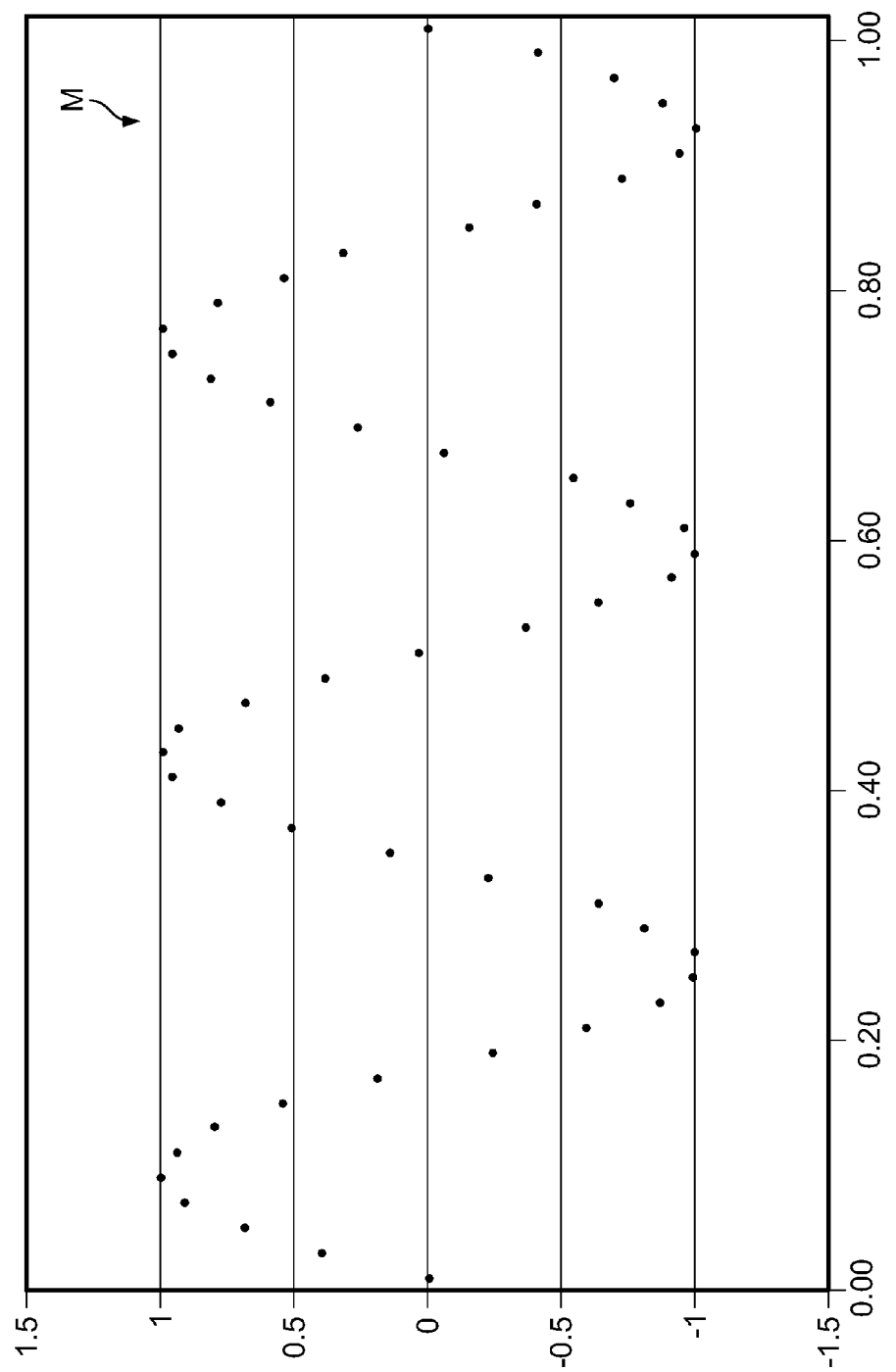
FIG. 9 shows an example series of filtered sample measurements from the accelerometer of FIG. 7.
Figure 10:
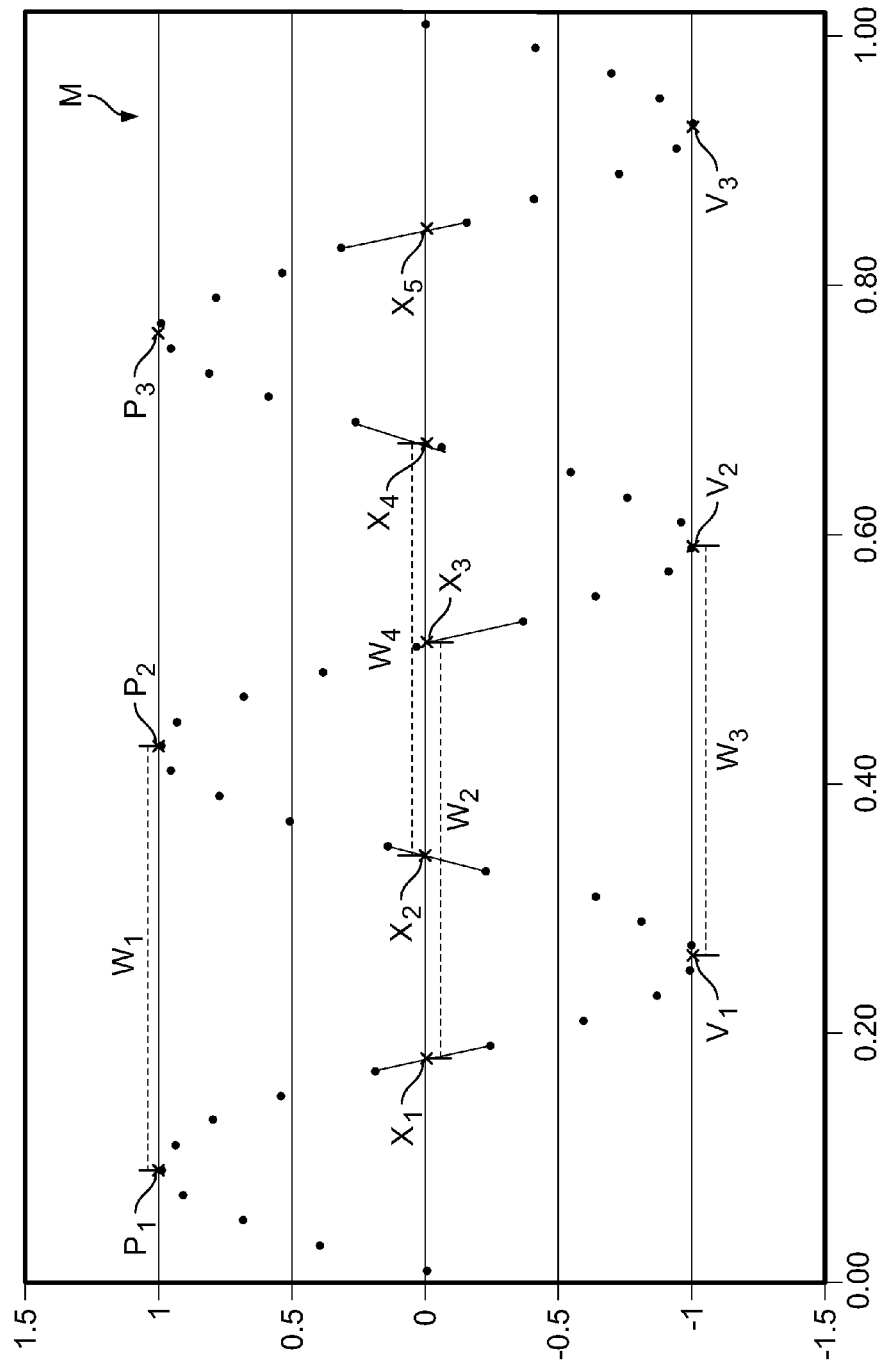
FIG. 10 shows the example series of filtered sample measurements of FIG. 9 with additional annotations to identify portions of the signal that are used in analyzing the periodicity of the repetitive motion.

At operation 826, the filtered signals are analyzed to determine the period of oscillation of the repetitive motion. FIGS. 9 and 10, which are discussed below, illustrate samples from an example signal and corresponding periods of repetitive motion. FIG. 9 shows an example series of filtered sample measurements M from an accelerometer captured over one second. FIG. 10 shows the same series of filtered sample measurements M with additional annotations to identify portions of the signal that are used in analyzing the periodicity of the repetitive motion. In some embodiments, each of the signals captured (i.e., the samples from each of the accelerometers in the accelerometer set) are analyzed to determine the period of oscillation of the repetitive motion. In other embodiments, the period of oscillation for the repetitive motion of only a single signal that has been identified as corresponding to the cadence (e.g., as described in operation 828, which is performed before operation 826 in at least some embodiments) is determined.

In some embodiments, the period of repetitive motion is estimated by analyzing the filtered signals to identify (or approximate) zero crossings of the signal. In some embodiments, the zero crossings of the signal are approximated by linearly interpolating between two adjacent samples that are on opposite sides of zero. In FIG. 10, five example approximated zero crossings are shown as zero crossings $X_1$-$X_5$. Additionally, in some embodiments, minima and maxima are also identified (or approximated) for each oscillation. In some embodiments, a parabolic approximation is used to approximate the minima and maxima of each oscillation. Other embodiments may use the value of a local minimum or maximum sample point. In FIG. 7, the maxima (peaks) are shown as maxima $P_1$-$P_3$ and the minima (valleys) are shown as minima $V_1$-$V_3$.

In some embodiments, the period of the repetitive motion is then estimated by measuring the distance between equivalent points in adjacent oscillations. For example, in some embodiments, the period is estimated by calculating the distance between adjacent wave maxima (e.g., in FIG. 10, width $W_1$ between the maxima $P_1$ and the maxima $P_2$). Similarly, the period can be estimated by calculating the distance between adjacent falling zero crossings (e.g., in FIG. 10, width $W_2$ between the zero crossing $X_1$ and the zero crossing $X_3$) and between adjacent rising zero crossings (e.g., in FIG. 10, width $W_4$ between the zero crossing $X_2$ and the zero crossing $X_4$). Additionally, the period can be estimated by calculating the distance between adjacent wave minima (e.g., in FIG. 10, the width $W_3$ between minima $V_1$ and minima $V_2$). In this manner, the width of a period of a single oscillation is measured four times, with the measurements being offset from each other by quarter oscillations.

In some embodiments, during operation 826, a single measurement of the period of oscillation for each of the signals (e.g., from each of the accelerometers) is calculated and stored. In some embodiments, this single measurement is added to a First-In-First-Out buffer that operates as a circular buffer for storing a predetermined number of measurements. As operation 826 is repeated, the FIFO buffer fills up with measurements. When the FIFO buffer is full, new measurements replace the oldest measurement in the FIFO buffer. In this manner, the FIFO buffer operates to store a predetermined number of the most recent measurements of the period of oscillation. Some embodiments include multiple FIFO buffers and each of the multiple FIFO buffers is configured to store measurements determined from a different accelerometer. However, as noted above, in some embodiments, measurements are only determined for a single signal. In these embodiments, a single FIFO buffer may be used to store the measurements from the signal that has been identified as corresponding to cadence.

In at least some embodiments, one or more FIFO buffers are configured to each store twenty-four measurements. Because these width measurements are calculated at every quarter step, twenty-four measurements are captured across approximately six steps (which takes two seconds at an example running cadence of 180 steps per minute). Because the FIFO queues are updated based upon oscillations occurring in the filtered signals in some embodiments, if the user stops running and stands still, the FIFO buffer will not be updated (and beneficially the calculated cadence will not be impacted by the stop).

In some embodiments, the measurements stored in the FIFO buffer or buffers are converted to a log base 2 scale.

Beneficially, when the measurements are converted to a log base 2 scale, the measurements remain linear across a range of cadence values.

At operation 828, a signal corresponding to the cadence is identified. In some embodiments, the signal corresponding to the cadence is a signal from at least one of the accelerometers that is most likely correlated with cadence. Because the orientation of the media-playback device 102 relative to the user U may not be fixed (e.g., when the media-playback device 102 is a smartphone or other mobile device), some embodiments analyze the signals captured by the various accelerometers to determine which of the accelerometers is oriented to detect movement in the direction of the repetitive motion at a given time. In other embodiments, a signal corresponding to the direction of relevant movement may be identified by combining the signals captured by multiple of the accelerometers.

In some embodiments, the signal corresponding to the direction of relevant movement is identified based on identifying the filtered accelerometer signal having the highest energy. In some embodiments, the energy of each of the filtered signals is calculated by rectifying the filtered signal and convoluting the rectified signal with a Hanning window of fifty samples (i.e., one second worth of samples at fifty Hz). Other embodiments use a number of samples selected from the range 10-100 samples. In some embodiments, other techniques are used to calculate the energy of the filtered signals.

In some embodiments, the highest energy signal is determined after each sample is recorded. In other embodiments, the highest energy signal is determined at a different interval. Further, in at least some embodiments, the identity of the highest energy signal is tracked (e.g., after every sample or every tenth sample) so that the identity of the highest-energy signal (and therefore the direction of the repetitive movement) can be updated if necessary. Beneficially, by tracking the highest energy signal, changes in the orientation of the media-playback device 102 will not interfere with identifying the accelerometer associated with the direction of the repetitive movement. In some embodiments, a signal corresponding to the cadence is identified by combining portions of multiple filtered series from different accelerometers to include the data from the series having the highest energy over each time interval.

In other embodiments, other methods of determining the direction of relative movement are used. For example, if the orientation of the media-playback device 102 relative to the user U is known or can be inferred, the signal from a particular accelerometer may be identified as corresponding to the expected direction of relevant motion based on the direction of movement to which the particular accelerometer is sensitive (which can be inferred from the orientation of the media-playback device 102 relative to the user). As an example, if the media-playback device 102 is oriented in an upright position, it can be inferred that that the Y-accelerometer 276 will be sensitive to vertical movement such as would be expected from running. In this example, the signal from the Y-accelerometer 276 is used in some embodiments.

At operation 830, a first aggregate value corresponding to the period of the oscillation over a first duration is calculated. In some embodiments, the first duration is based on a predetermined number of oscillations, such as six oscillations. Other embodiments have a first duration based on a different predetermined number of oscillations such as 4-10 oscillations. In other embodiments, the first duration corresponds to a predetermined time period such as 2-10 seconds.

In some embodiments, the first aggregate value is calculated by averaging multiple estimated widths of the period of oscillation. For example, in some embodiments, twenty-four estimated width values captured every quarter oscillation (e.g., the values stored in the FIFO buffer described at least with respect to operation 826) are averaged to generate the first aggregate value. In some embodiment, the FIFO buffer is updated with a new value every quarter oscillation and the first aggregate value is also recalculated every quarter oscillation using the updated values in the FIFO buffer. In some embodiments, the FIFO buffer is pre-populated with measurements that correspond to a typical cadence at the start of method 820 so that a reasonable first aggregate value may be calculated before enough measurements have been captured to fully fill the FIFO buffer. In some embodiments, the typical cadence value used to generate values to prepopulate the FIFO buffer is 165 steps per minute. In other embodiments, the typical cadence is calculated based on historic cadence information associated with the user (such as cadence data captured from previous similar activities performed by the user). Because the first aggregate value is based on averaging multiple measurements, in at least some embodiments, the aggregate value is not significantly affected by intermittent sampling errors or minor, short variations in cadence.

Furthermore, in some embodiments, a series of first aggregate values is generated as additional measurements are captured. In some embodiments, each of the values in the series of first aggregate values correspond to the period of oscillation at different time intervals over which the series of measurements span. In some embodiments, a first aggregate value is generated and included in the series after every quarter oscillation. In other embodiments, the first aggregate value is generated at a different frequency such as once every oscillation, once every second oscillation, etc.

At operation 832, a second aggregate value is calculated based on smoothing the first aggregate value. In some embodiments, the second aggregate value is updated (or re-calculated) when the first aggregate value is updated. In some embodiments, the second aggregate value is calculated using equation 1 shown below:

$$y(i)=y(i-1)+\alpha \times (x(i)-y(i-1)) \qquad (1)$$

where y(i) represents the currently calculated value for the second aggregate value;

y(i−1) represents the previously calculated value for the second aggregate value;

x(i) represents the most recently calculated value for the first aggregate value (e.g., as calculated by operation 830); and α is a smoothing coefficient.

In some embodiments, the smoothing coefficient α is 0.07. In other embodiments, the smoothing coefficient α is a value selected from the range 0.01-0.25. In yet other embodiments, the smoothing coefficient α is a value selected from the range 0.01-0.99. The smoothing coefficient α is related to the sample rate; accordingly, in some embodiments with higher sample rates, lower values are used for the smoothing coefficient α. The smoothing coefficient α causes the second aggregate value to change more slowly than the first aggregate value changes in response to changes in cadence. In some embodiments, the second aggregate value is initially set to a value that corresponds to a cadence that is slightly lower than would be expected for the activity. For example, in some embodiments that relate to running, the second aggregate value is initially set to a value corresponding to a cadence of 140 steps per minute. In other embodiments, the second aggregate value is initially set to a value that is twenty-five steps per minute less than the user's historic average cadence for the activity.

In at least some embodiments, other equations or techniques are used to smooth the second aggregate value. Embodiments are possible using any technique for smoothing the second aggregate value in which a previously computed value for the second aggregate value is used in computing an updated value for the second aggregate value.

Like the first aggregate value, in some embodiments, a series of second aggregate values is generated as additional measurements are captured. In some embodiments, each of the values in the series of second aggregate values correspond to a smoothed first aggregate value for different time intervals over which the series of measurements span. Also like the series of first aggregate values, in various embodiments, the values in the series of second aggregate values are generated at various frequencies such as after every quarter oscillation, after every oscillation, after every other oscillation, etc.

At operation 834, it is determined whether the first aggregate value and the second aggregate value satisfy predetermined tolerances. As noted above, the second aggregate value changes more slowly than the first aggregate value changes in response to a change in cadence (e.g., when the user first starts running, when the runner changes cadence, etc.). Accordingly, in some embodiments, the difference between the first aggregate value and the second aggregate value indicates whether the user's cadence has been stable or changing recently.

In some embodiments, the predetermined tolerances include both a difference tolerance and a duration requirement. An example of a difference tolerance is predetermined number of steps per minute difference between the first aggregate value and the second aggregate value (e.g., within two steps per minute, or within a certain duration of time measured on a linear or log base 2 scale, etc.). An example of a duration requirement is a requirement that the first aggregate value and the second aggregate value satisfy the difference tolerance for a predetermined duration (e.g., the first aggregate value is within two steps per minute of the second aggregate value for at least two steps). In some embodiments, the predetermined duration is measured in steps, time, or otherwise.

If it is determined that the first aggregate value and the second aggregate value satisfy predetermined thresholds, the method 820 continues to operation 836 where the cadence is determined. If not, the method 820 continues to operation 838 where additional measurements are captured from the accelerometers in the accelerometer set and the process repeats starting at operation 824.

At operation 836, a cadence value is determined. In some embodiments, the cadence value is determined based on the second aggregate value. To determine a cadence value from the second aggregate value, the second aggregate value may need to be converted from a duration in log base 2 scale to a frequency value. Once the cadence value has been determined, it can be used for many purposes, including selecting appropriate media content items.

In some embodiments, the method 820 is used to both determine an initial cadence and to detect changes in cadence throughout an activity. As noted above, to detect an initial cadence, the FIFO buffer or buffers and second aggregate values may be set to certain initial values that are selected to minimize the number of steps (or time) required to accurately detect a stable cadence. For example, by populating the FIFO buffer or buffers with values that correspond to an expected (or typical) cadence value, the first aggregate value calculated by operation 830 will immediately be close to a value that corresponds to the user's instantaneous cadence. As another example, initially setting the second aggregate value to a value that corresponds to a cadence that is slightly outside of the expected range may prevent falsely determining a stable cadence before the user has actually reached a stable cadence. Instead, a stable cadence will be determined after the user has performed with a stable cadence for a sufficient time to cause the initially low second aggregate value to converge towards the first aggregate value. In some embodiments, a stable cadence is detected within ten to fifteen steps.

In some embodiments, a third aggregate value is calculated in a manner similar to the calculation of the second aggregate value (as described above with respect to operation 832). The third aggregate value may be used to determine when the user has changed cadence after an initial cadence has been determined. In some embodiments, the third aggregate value represents a smoothing of the second aggregate value. In this manner, the third aggregate value trails the second aggregate value and takes a longer time to react to changes in cadence. Additionally, in some embodiments, when the third aggregate value and the second aggregate value are within a predetermined difference threshold of each other for a predetermined duration threshold it is determined that the detected cadence value has stabilized. If the detected cadence value has stabilized at a value that is different from the previously determined cadence by a sufficient threshold a new cadence value is determined (and may be used in media content selection or otherwise). Examples of sufficient thresholds include two steps per minute, five steps per minute, or ten steps per minute. In some embodiments, the sufficient threshold is a value selected from the range 1-15 steps per minute.

In at least some embodiments, the third aggregate value is calculated using an equation that is similar to equation 1 (described above with respect to operation 832) such as equation 2 shown below:

$$z(i)=z(i-1)+\beta \times (y(i)-z(i-1)) \qquad (2)$$

where
  $z(i)$ represents the currently calculated value for the third aggregate value;
  $z(i-1)$ represents the previously calculated value for the third aggregate value;
  $y(i)$ represents the most recently calculated value for the second aggregate value (e.g., as calculated by operation 832); and
  $\beta$ is a second smoothing coefficient.

In some embodiments, the second smoothing coefficient $\beta$ is 0.02. In other embodiments, the second smoothing coefficient $\beta$ is a value selected from the range 0.001-0.1. In yet other embodiments, the smoothing coefficient $\alpha$ is a value selected from the range 0.001-0.99. Like the smoothing coefficient $\alpha$, the smoothing coefficient $\beta$ is related to the sample rate; accordingly, in some embodiments with higher sample rates, lower values are used for the smoothing coefficient $\beta$. The second smoothing coefficient $\beta$ causes the third aggregate value to change even more slowly than the second aggregate value changes in response to changes in cadence. As mentioned above with respect to the second aggregate value, the third aggregate value is also calculated using other smoothing equations in some embodiments.

Like the first aggregate value and the second aggregate value, in some embodiments, a series of third aggregate values is generated. The values in the series of third aggregate values correspond to smoothed second aggregate values over various intervals over which the series of measurements span. The values in the series of third aggregate values may be generated at the same frequency as the values in the series of second aggregate values or at a different frequency. Although the examples described herein use accelerometers, in other embodiments other types of movement-determining devices are used. A movement-determining device is a device that operates to capture measurements related to movement of the media-playback device. An accelerometer is an example of a movement-determining device.

In embodiments, the media playback device can play a song or song version that is created dynamically rather than playing a pre-recorded song or song version. That is, each of one or more parts in a song are created real-time and are based on one or more rules.

In embodiments, the media-playback device 102 includes an altimeter or pressure sensor that can detect changes in height. In these embodiments, the media-playback device 102 begins playback of one or more musical parts. Based on one or more rules, the parts vary depending upon a user's cadence, location, change in altitude, etc. For example, the drums part of a song can vary in intensity, complexity, syncopation, etc., at different cadences. As the user maintains the cadence, or as the cadence changes, other parts are added, such as strings, synthesizer, horns, vocals, etc. The tempo and intensity of the song can also change. If the user's altitude changes, by ascending stairs or a hill, for example, additional components are added or eliminated, or the parts could crescendo. In this way, the song changes dynamically depending on the user's cadence and activity.

As noted previously, although many of the examples provided above are described with respect to running, other embodiments relate to other repetitive motion activities as well such as cycling, swimming, and rowing.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A computer readable data storage device storing instructions that, when executed by at least one processing device, cause a media-playback device to:
    acquire a first cadence;
    initiate playback of a first song version selected from a plurality of related song versions,
        wherein the selection of the first song version is based on the first cadence; and
        wherein the first song version is divided into a plurality of chapters;
    determine a location of playback for the first song version including a chapter number of a chapter of the plurality of chapters, and a percentage of the chapter, played;
    acquire a second cadence; and
    initiate playback of a second song version selected from the plurality of related song versions,
        wherein the selection of the second song version is based on the second cadence;
        wherein the second song version is divided into the plurality of chapters;
        wherein playback of the second song version begins at a transition position in the second song version that corresponds to the location of playback for the first song version;
        wherein the first song version and the second song version share at least one characteristic; and
        wherein each of the plurality of related song versions is different from each of the other plurality of related song versions in at least one characteristic.

2. The computer readable data storage device of claim 1, wherein the playback of the second song version is faded in at the same time the playback of the first song version is faded out.

3. The computer readable data storage device of claim 1, wherein the first song version and the second song version share at least a melody; and
    wherein a tempo of the first song version and a tempo of the second song version are different.

4. The computer readable data storage device of claim 3, wherein a tempo of the first song version is at least about 5 beats per minute different than a tempo of the second song version.

5. The computer readable data storage device of claim 4, wherein the tempo of the first song version corresponds to the first cadence; and
    wherein the tempo of the second song version corresponds to the second cadence.

6. The computer readable data storage device of claim 3, further comprising instructions that, when executed by the at least one processing device, cause the media-playback device to:
    request a stream of the first song version from a media server; and
    request a stream of the second song version from the media server.

7. A method for transitioning from a first song version to a second song version, the method comprising:
    acquiring a first cadence;
    selecting a first song version that corresponds to the first cadence, the first song version being divided into a plurality of chapters;
    streaming the first song version;
    determining a location of playback for the first song version including a chapter number of a chapter of the plurality of chapters, and a percentage of the chapter, played;
    acquiring a second cadence;
    selecting a second song version that corresponds to the second cadence, the second song version being divided into the plurality of chapters; and
    streaming the second song version beginning at a transition position in the second song version that corresponds to the location of playback for the first song version.

8. The method of claim 7, wherein each of the plurality of chapters is between about 2 minutes and about 12 minutes.

9. The method of claim 7, wherein the first song version is faded out at the same time that the second song version is faded in.

10. The method of claim 9, wherein the first song version and the second song version are faded in and faded out for about 2 seconds to about 5 seconds.

11. The method of claim 7, wherein a tempo of the first song version is at least about 5 beats per minute different from a tempo of the second song version.

12. A media server, comprising:
a database including at least one computer readable data storage device, comprising:
a plurality of song versions, wherein each of the plurality of song versions has a different tempo than each of the other song versions;
wherein the at least one computer readable data storage device having instructions stored thereon which, when executed by at least one processing device, cause the media server to:
  receive a first request to begin streaming a first song version, where the first song version has a first tempo;
  enable streaming of a first song version, the first song version being divided into a plurality of chapters;
  receive a second request to begin streaming a second song version, wherein the second song version has a second tempo and the second song version being divided into the plurality of chapters;
  wherein the second request includes a location of playback for the second song version, the location of playback including a chapter number of a chapter of the plurality of chapters, and a percentage of the chapter, played; and
  wherein streaming the second song version begins at the location of playback that corresponds to the location of playback for the first song version; and
  enable streaming of the second song version,
  wherein the first tempo and the second tempo are different by at least about 5 beats per minute.

13. The media server of claim 12, wherein the at least one computer readable data storage device further includes instructions stored thereon which, when executed by at least one processing device, cause the media server to:
  stop streaming the first song version after a predetermined time of streaming the second song version.

14. The media server of claim 12, wherein the first song version and the second song version have a same melody.

* * * * *